United States Patent [19]

Okada et al.

[11] Patent Number: 5,062,710

[45] Date of Patent: Nov. 5, 1991

[54] LINEAR PHASE RAMP FIBER OPTIC GYRO

[75] Inventors: Kenichi Okada; Masashi Nishino; Shu Tanigawa, all of Tokyo, Japan

[73] Assignee: Japan Aviation Electronics Industry Limited, Tokyo, Japan

[21] Appl. No.: 510,846

[22] Filed: Apr. 18, 1990

[30] Foreign Application Priority Data

Apr. 20, 1989 [JP] Japan .................................. 1-102188

[51] Int. Cl.⁵ ............................................. G01C 19/72
[52] U.S. Cl. ................................................. 356/350
[58] Field of Search ............................. 356/350, 345; 250/227.19, 227.27

[56] References Cited

U.S. PATENT DOCUMENTS 4,981,358 1/1991 McBrien et al. ..................... 356/350

FOREIGN PATENT DOCUMENTS 3244010 5/1984 Fed. Rep. of Germany .
2152207 7/1985 United Kingdom .

OTHER PUBLICATIONS

"Double Closed-Loop Hybrid Fiber Gyroscope Using Digital Phase Ramp", Lefevre et al., 1984.
"Fiber Gyroscopes", Lefevre et al., Thomson Laboratories, 1986.
"Fibre Optic Gyroscope", Electronics & Wireless World, vol. 95, No. 1636, Feb. 1989, pp. 190-191.

Primary Examiner—Samuel Turner
Attorney, Agent, or Firm—Pollock, Vande Sande and Priddy

[57] ABSTRACT

In a closed loop type fiber optic gyro the number of waves of a ramp voltage for providing a phase difference between right-handed light and left-handed light which pass through an optical fiber coil is counted, the ramp voltage is converted into a digital value, and the digital value is used as a fraction of the calculated number of waves of the ramp voltage, thereby improving the accuracy of the azimuth angle being measured.

2 Claims, 2 Drawing Sheets

LINEAR PHASE RAMP FIBER OPTIC GYRO

BACKGROUND OF THE INVENTION

The present invention relates to a linear phase ramp fiber optic gyro and, more particularly, to a closed loop type fiber optic gyro in which right-handed light and left-handed light having propagated through an optical fiber coil are caused by interference means to interfere with each other; a phase difference is provided between the right-handed light and the left-handed light by phase difference generating means disposed between the interference means and one end of an optical path; interference light available from the interference means is converted into an electrical signal; information about the phase difference between the right-handed light and the left-handed light is detected from the electrical signal; a ramp voltage of a frequency corresponding to the phase difference information is produced; and the ramp voltage is negatively fed back to the phase difference generating means so that the phase difference between the right-handed light and the left-handed light is reduced to zero.

FIG. 1 shows a conventional closed loop type linear phase ramp fiber optic gyro. Light emitted from a light source 11 is applied via an optical coupler 12 and a polarizer 13 to an optical coupler 14, from which it is incident, as right-handed light and left-handed light, to both ends of an optical fiber coil 15 which forms an optical path. The right-handed light and the left-handed light, which propagate through the optical fiber coil 15, are phase modulated by the output of an oscillator 17 in a phase modulator 16 disposed between one end of the optical fiber coil 15 and the optical coupler 14. The right-handed light and the left-handed light thus phase modulated are coupled together by the optical coupler 14 and interfere with each other, thereafter being applied again via the polarizer 13 and the optical coupler 12 to a photodetector 18 which serves as photoelectric conversion means. The interference light having thus reached the photodetector 18 is converted into an electrical signal, which is applied to a synchronous detector 19, wherein the same component as the phase modulation frequency is extracted from the signal. The output of the synchronous detector 19 is integrated by an integrator 21, and a ramp voltage of a frequency corresponding to the integrated output is generated by a ramp voltage generator 22. The ramp voltage is used to control a feedback phase generator 23 disposed as a phase difference generator between the optical coupler 14 and the other end of the optical fiber coil 15. The feedback phase generator 23 is formed by a phase modulator, which provides a phase difference between the right-handed light and the left-handed light and is controlled by the negative feedback thereto of the ramp voltage so that the phase difference between the right-handed and the left-handed light is reduced to zero.

The synchronous detector 19 detects information about the phase difference between the right-handed and the left-handed light. Letting the phase difference being represented by $\Delta\Phi$, the output V of the synchronous detector 19 is as follows:

$$V = K \cdot \sin\Delta\Phi \quad (1)$$

where K is a constant. The phase difference $\Delta\Phi$ is expressed as follows:

$$\Delta\Phi = \Delta\Phi_\Omega + \Delta\Phi_f \quad (2)$$

where $\Delta\Phi_\Omega$ represents a Sagnac phase difference which results from the application of an angular velocity to the optical fiber coil 15 and is given by the following equation:

$$\Delta\Phi_\Omega = \frac{4\pi RL}{C\lambda} \cdot \Omega \quad (3)$$

where R is the radius of the optical fiber coil 15, L is the length of the optical fiber coil 15, C is the velocity of light, $\lambda$ is the wavelength of light in a vacuum, $\Omega$ is an input angular velocity, and $\Delta\Phi_f$ is the phase difference created by the feedback phase generator 23. The ramp voltage is applied from the ramp voltage generator 22 to the feedback phase generator 23, by which the right-handed light and the left-handed light undergo such phase shifts as indicated by the solid line (CW) and the broken line (CCW) in the upper portion of FIG. 2. The left-handed light is delayed behind the right-handed light by the time $\tau$ of propagation of light through the optical fiber coil 15. As a result of this, the phase difference $\Delta\Phi_f$ between the right-handed and the left-handed light becomes such as shown in the lower portion of FIG. 2. If the feedback phase difference generator 23 is adapted so that a maximum value of the phase shift by the ramp voltage is $2\pi k$ (where k is an integer), the phase difference $\Delta\Phi_f$ between the right-handed and the left-handed light is given by the following equation:

$$\Delta\Phi_f = \frac{2\pi nL}{C} \cdot k \cdot f \quad (4)$$

where f is the frequency of the ramp voltage and n is the refractive index of the optical fiber coil 15. Since there is established a closed loop in which the feedback phase generator 23 is controlled so that the Sagnac phase difference $\Delta\Phi_\Omega$ in the optical fiber coil 15 is cancelled, namely, the phase difference $\Delta\Phi$ between the right handed and the left-handed light is reduced to zero, the frequency f of the ramp voltage is given, from Eqs. (2), (3) and (4), as follows:

$$f = \frac{2R}{n\lambda k} \cdot \Omega \quad (5)$$

By measuring the frequency f of the ramp voltage from Eq. (5), the input angular velocity $\Omega$ can be obtained using $2R/(n \cdot \lambda \cdot k)$ as a proportional constant.

The output of this closed loop type fiber optic gyro is provided in the form of a pulse as indicated by Eq. (5). Incidentally, the pulse weight, i.e. an angular increment per pulse, can be obtained from Eq. (5) as follows:

$$P_w = \frac{\Omega}{f} = \frac{n\lambda k}{2R} \quad (6)$$

In an actual medium-accuracy fiber optic gyro (L=300 m or so and R=0.020 or so) whose short-term bias stability is approximately 1°/hr (in the case where the sample time of angular velocity output is about 100 seconds), the pulse weight $P_w$ is nearly equal to 6 arc-sec/pulse. In general, the value k is set as k=1.

In the case where the medium-accuracy fiber optic gyro whose pulse weight is nearly equal to 6 arc-sec/pulse or so as mentioned above is used to measure the attitude of a flying object by integrating pulses available from the ramp voltage, the influence of a quantization error (a 1-bit error) diminishes with the lapse of time and hence does not matter but poses a problem when accurate measurement of the angular velocity which is applied to the flying object is required.

For example, in the case of obtaining the applied angular velocity by sampling angular velocity output data every 0.01 second, an angular velocity noise, or a maximum error (quantization noise or 1-pulse noise) of 0.166°/sec$^{p-p}$ is generated depending on whether the last pulse is counted or not. This value of error is appreciably large.

Further, the pulse weight Pw is in inverse proportion to the radius R of the optical fiber coil 15 as indicated by Eq. (6). This is contradictory to an effort of improving the performance of optical and electrical systems of the fiber optic gyro to reduce the radius of the optical fiber coil to thereby attain miniaturization of the gyro. An increase in the pulse weight Pw caused an increase in the angular velocity noise, limiting the application to be made of this type of fiber optic gyro.

SUMMARY OF THE INVENTION

It is therefore an object of the present invention to provide a closed loop type fiber optic gyro of low angular velocity noise.

In the closed loop type fiber optic gyro of the present invention a ramp voltage signal is converted by A/D converting means into a digital signal for input into a feedback phase generator which acts as phase difference generating means. This digital signal provides an accurate indication of angle variations which occur until application of the next pulse.

DESCRIPTION OF THE PREFERRED EMBODIMENT

Figure 1:
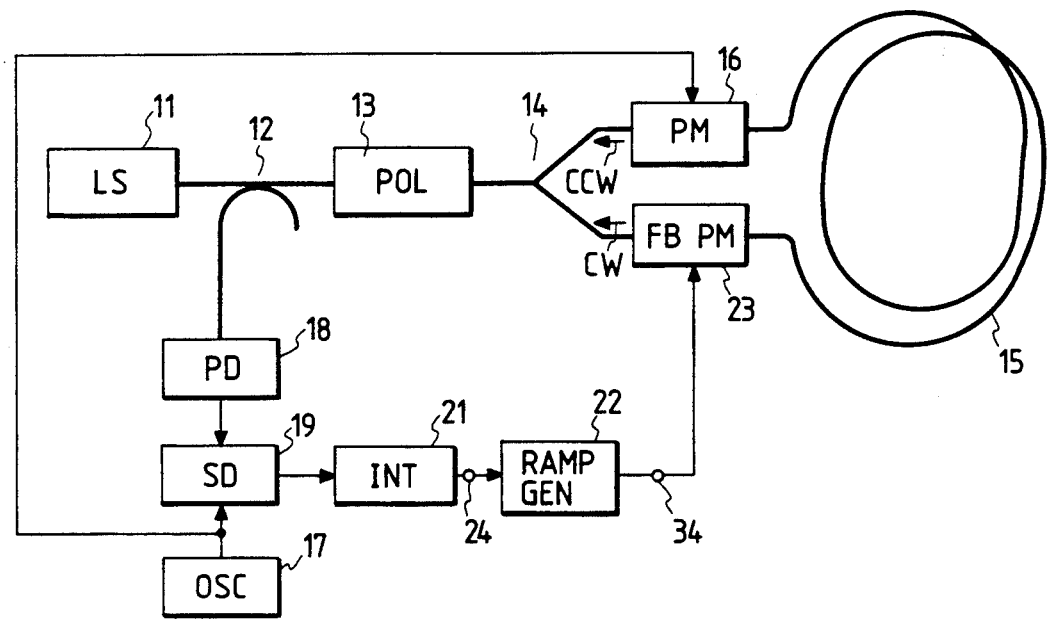
FIG. 1 is a block diagram showing a conventional closed loop type fiber optic gyro.
Figure 2:
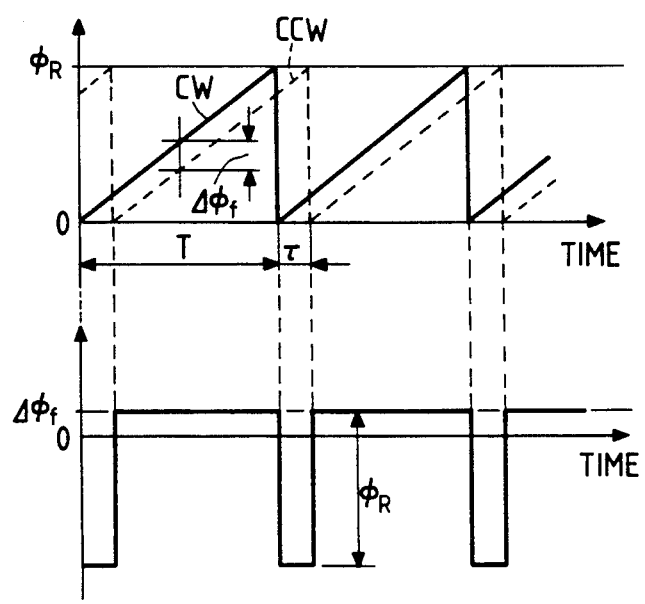
FIG. 2 is a schematic diagram showing phase shifts of and a phase difference between right-handed light and left-handed light which are caused by a feedback phase generator.
Figure 3:
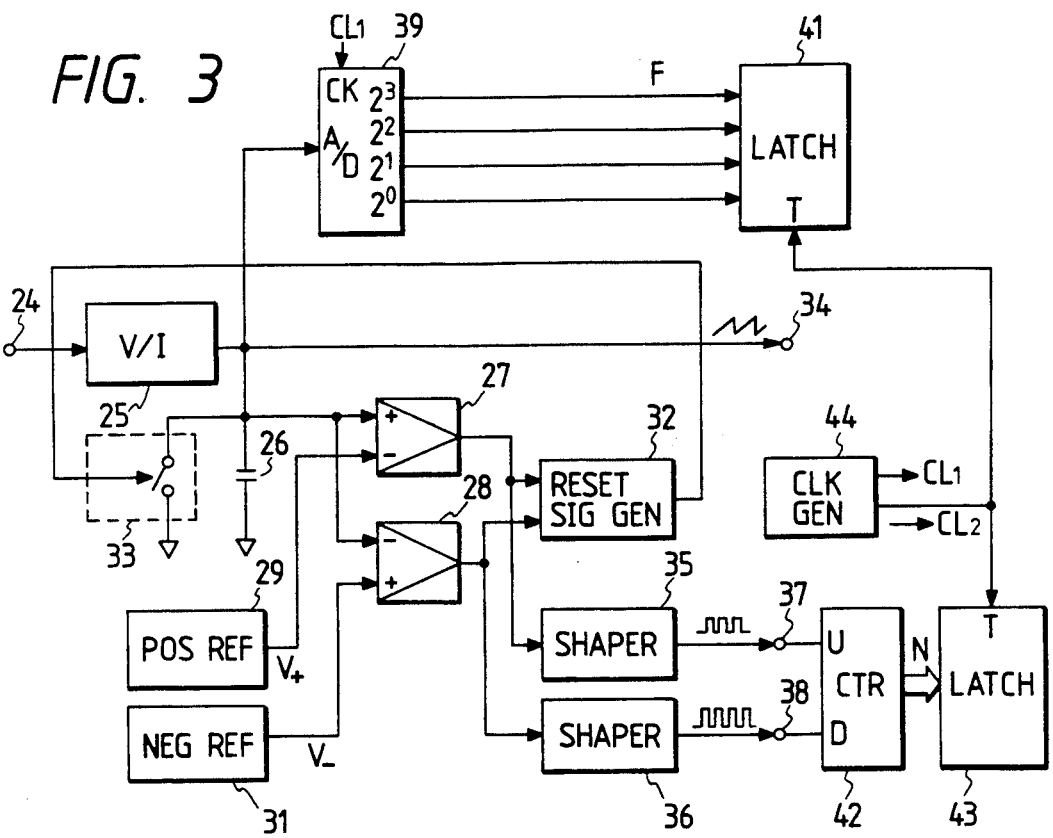
FIG. 3 is a block diagram illustrating the principal part of an embodiment of the present invention.

FIG. 3 illustrates in block form the principal part of an embodiment of the present invention. Shown in FIG. 3 is only the part corresponding to the ramp voltage generator 22 in &:he fiber optic gyro depicted in FIG. 1, since the other circuit arrangements of this embodiment are identical with those shown in FIG. 1. The output voltage of the integrator 21 in FIG. 1 is applied to an input terminal 24, and positive and negative voltages provided thereto are converted by a voltage-current converter 25 into positive and negative currents, by which a capacitor 26 is charged. The voltage of the capacitor 26 is compared with a reference voltage $V_+$ of a positive reference voltage source 29 in a comparator 27 and with a reference voltage $V_-$ of a negative reference voltage source 31 in a comparator 28. The comparator 27 provides a low-level or high-level output depending on whether the voltage of the capacitor 26 is lower or higher than the reference voltage $V_+$.

The comparator 28 outputs a low-level or high-level output depending on whether the voltage of the capacitor 26 is lower or higher in absolute value than the reference voltage $V_-$.

The outputs of the comparators 27 and 28 are applied to a reset signal generator 32 which, when supplied with the high-level output, actuates a switch 33, discharging the capacitor 26. In order for the switch 33 to rapidly discharge the capacitor 26 in response to the signal from the reset signal generator 32, it is customary to employ, as the switch 33, an FET switch of high-speed operation and of small leakage current. The positive reference voltage $V_+$ is used to determine a positive maximum ramp voltage $+V_R$ and is adjusted so that a positive maximum phase shift of the ramp voltage is $2\pi k$. On the other hand, the negative reference voltage $V_-$ is a voltage for determining a negative maximum ramp voltage $-V_R$ and is adjusted so that a negative maximum phase shift of the ramp voltage is $-2\pi k$. The voltage of the capacitor 26 becomes positive and negative ramp voltages of frequencies corresponding to the positive and negative currents from the voltage-current converter 25. The ramp voltage is applied via an output terminal 34 to the feedback phase generator 23 in FIG. 1. The outputs of the comparators 27 and 28 are supplied to pulse shapers 35 and 36, respectively, which provide at terminals 37 and 38 pulses which have the same frequency as the frequency of the ramp voltage of the capacitor 26 and a pulse width and a pulse height which meet interface requirements. The pulses at the terminal 37 are counted up by an up-down counter 42 and counted down with the pulses at the terminal 38. The count value of the up-down counter 42 indicates the input angle, i.e. the current azimuth angle of the optical fiber coil, and its changing ratio, that is, a change in the count value per unit time, represents the input angular velocity.

In the present invention, the ramp voltage of the capacitor 26 is converted by an A/D converter 39 into a digital value every high-speed clock $CL_1$ so as to calculate a fraction of the number of pulses counted in a predetermined period of time. The count value of the up-down counter 42 is latched in a latch 43 every low-speed clock $CL_2$ of a desired period, and at the same time, the output digital value of the A/D converter 39 is latched in a latch 41 every low-speed clock $CL_2$. The clocks $CL_1$ and $CL_2$ are produced by a clock generator 44. The frequency of the high-speed clock $CL_1$ is selected sufficiently higher than a predicted frequency of the ramp voltage, for instance, about 100 times higher than the latter. The frequency of the low-speed clock $CL_2$ is set to, for example, 1/100 to 1/10000 of the predicted frequency of the ramp voltage.

Figure 4:
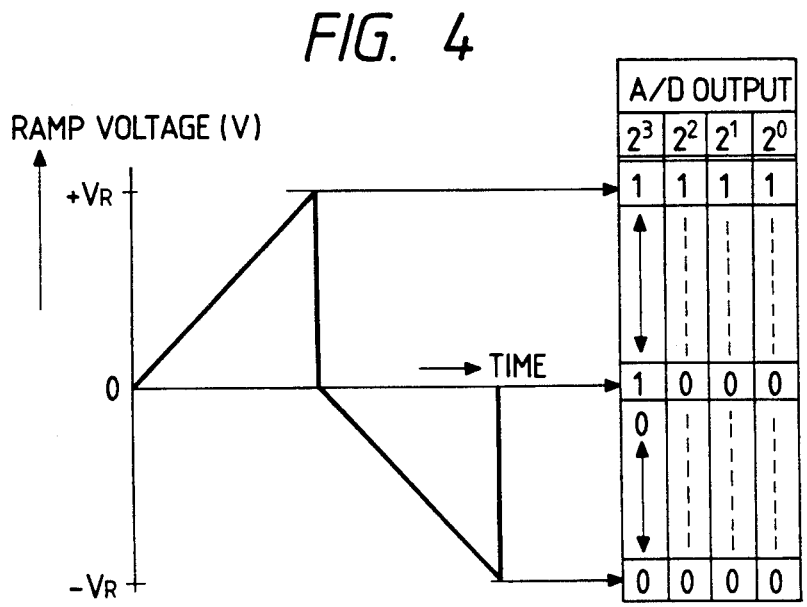
FIG. 4 is a schematic diagram showing an example of the relationship between the input and output of an A/D converter 39 used in the embodiment.

FIG. 4 shows an example of the relationship between the input and output of the A/D converter 39. The gain of the A/D converter 39 is set so that it yields a digital signal "1000" when the input is 0 V, a digital signal "1111" when supplied with the positive maximum voltage $+V_R$, and a digital signal "0000" when supplied with the negative maximum voltage $-V_R$, as shown in FIG. 4. Since the peak voltage $V_R$ of the ramp voltage is thus made to correspond to a maximum value "111", one ramp voltage is divided into eight equal parts. Letting the output value of the A/D converter 39 be represented by F, F/8 fractional ramp voltages are counted. Letting the count value of the counter 42 be represented by N, the number of ramp voltages desired to obtain is N+F/8 which is calculated from the values N and F latched by the low-speed clock CL$_2$ in the latches 43 and 41, respectively. In practice, the values N and F of the latches 43 and 41 are read into a microcomputer (not shown), in which Pw X (N+F/8) is computed using Eq. (6) to obtain the current azimuth angle of the optical fiber coil 15 relative to its initial azimuth angle. In the case of obtaining the angular velocity, the microcomputer needs only to calculate a variation (a difference) in the azimuth angle in a predetermined time T and divide the variation by the time T.

As described above, according to the present invention, the conversion of the ramp voltage by the A/D converter 39 into digital form permits accurate or fine detection of variations in the azimuth angle of the optical fiber coil during one period of the ramp voltage, that is, in the time intervals between successive pulse outputs of the fiber optic gyro. In the embodiment described above, it is possible to detect the above-mentioned variations with an accuracy of ⅛ of one pulse weight Pw=6 arc-sec/pulse, because the ramp voltage is divided into eight. Consequently, the angular velocity noise of one pulse in the sampling time, for example, 0.01 sec, of the angular velocity output data is improved eight-fold to 0.208°/sec$^{p-p}$, and hence can be reduced appreciably. The gain of the A/D converter 39 need not always be adjusted so that the maximum value "3" agrees to the peak value of the ramp voltage but it is necessary only to preknow the converted digital value F$_p$ of the A/D converter 39 corresponding to the peak value of the ramp voltage. In such a case, the fraction can be given by F/F$_p$. An increase of the number of bits used in the A/D converter 39 permits more accurate detection of variations in the azimuth angle and affords further reduction of the angular velocity noise.

It will be apparent that many modifications and variations may be effected without departing from the scope of the novel concepts of the present invention.

What is claimed is:

1. A linear phase ramp fiber optic gyro comprising:
   means defining an optical path which makes at least one turn;
   means for applying right-handed light and left-handed light to said optical path;
   interference means whereby right-handed light and left-handed light having propagated through said optical path are caused to interfere with each other;
   phase difference generating means between said interference means and one end of said optical path for providing a phase difference between said right-handed light and said left-handed light;
   photoelectric conversion means whereby the intensity of interference light available from said interference means is output as an electrical signal;
   phase detecting means for detecting and outputting information about said phase difference between said right-handed light and said left-handed light, contained in the output electrical signal of said photoelectric conversion means;
   ramp voltage generating means for generating a ramp voltage output of a frequency and polarity corresponding to the output of said phase detecting means and for negatively feeding said ramp voltage output back to said phase difference generating means so that the phase difference between said right-handed light and said left-handed light is reduced to zero;
   counter means for counting pulses of said ramp voltage generated by said ramp voltage generating means;
   clock generating means for generating first and second clocks, said second clocks being higher in frequency than said first clocks;
   A/D conversion means for converting said ramp voltage output of said ramp voltage generating means into a digital value upon each occurrence of said second clocks; and
   first and second latches for simultaneously latching the count value of said counter means and the output digital value of said A/D conversion means upon each occurrence of said first clocks;
   the count value of said counter means and said digital output value of said A/D conversion means respectively latched in said first and second latches being used in combination as angular information.

2. The fiber optic gyro of claim 1, wherein said counter means is an up-down counter for counting up or down said pulses of said ramp voltage in accordance with the polarity of said ramp voltage.

* * * * *